(12) United States Patent
Okada et al.

(10) Patent No.: US 11,493,669 B2
(45) Date of Patent: Nov. 8, 2022

(54) ANTI-REFLECTIVE BODY, CAMERA UNIT, MOBILE DEVICE, AND METHOD FOR MANUFACTURING ANTI-REFLECTIVE BODY

(71) Applicant: OTSUKA TECHNO CORPORATION, Naruto (JP)

(72) Inventors: Yasuyuki Okada, Naruto (JP); Hideaki Sato, Naruto (JP); Yosuke Kamikado, Naruto (JP); Yukio Takahashi, Naruto (JP); Yuta Uchiyama, Naruto (JP); Naoki Oyama, Naruto (JP); Shunsuke Morimoto, Naruto (JP)

(73) Assignee: OTSUKA TECHNO CORPORATION, Naruto (JP)

( * ) Notice: Subject to any disclaimer, the term of this patent is extended or adjusted under 35 U.S.C. 154(b) by 559 days.

(21) Appl. No.: 16/462,457

(22) PCT Filed: Jul. 11, 2017

(86) PCT No.: PCT/JP2017/025263
§ 371 (c)(1),
(2) Date: May 20, 2019

(87) PCT Pub. No.: WO2018/092353
PCT Pub. Date: May 24, 2018

(65) Prior Publication Data
US 2019/0317250 A1    Oct. 17, 2019

(30) Foreign Application Priority Data
Nov. 21, 2016    (JP) .............................. JP2016-226195

(51) Int. Cl.
*G02B 27/00*        (2006.01)
*G02B 1/118*        (2015.01)
(Continued)

(52) U.S. Cl.
CPC ................ *G02B 1/118* (2013.01); *G02B 1/11* (2013.01); *G02B 27/0018* (2013.01); *G02B 7/02* (2013.01)

(58) Field of Classification Search
CPC ... G02B 1/00; G02B 1/10; G02B 1/11; G02B 1/118; G02B 5/00; G02B 5/12;
(Continued)

(56) References Cited

U.S. PATENT DOCUMENTS 5,225,933 A * 7/1993 Myers ................... G02B 5/003
359/614
6,359,735 B1    3/2002 Gombert et al.
(Continued)

FOREIGN PATENT DOCUMENTS

CN    1447134 A    10/2003
CN    1664639 A    9/2005
(Continued)

OTHER PUBLICATIONS

International Search Report, issued in PCT/JP2017/025263, PCT/ISA/210, dated Sep. 19, 2017.
(Continued)

*Primary Examiner* — Thong Q Nguyen
(74) *Attorney, Agent, or Firm* — Birch, Stewart, Kolasch & Birch, LLP

(57) ABSTRACT

An anti-reflective structural body is constituted of an integrally molded article and includes an anti-reflective structure formed on a base surface that constitutes an outer surface of the molded article, and the anti-reflective structure includes a plurality of recesses, each being formed to be recessed from the base surface independently of mutually adjacent recesses and having an inclined surface, which is inclined with respect to the base surface and forms at least one punctiform or linear apex portion at a bottom portion.

13 Claims, 13 Drawing Sheets

(51) Int. Cl.
*G02B 1/11* (2015.01)
*G02B 7/02* (2021.01)

(58) Field of Classification Search
CPC ...... G02B 5/122; G02B 27/0018; G02B 1/12;
G02B 1/14; G02B 5/003; G02B 27/00
USPC .................................................. 359/599–613
See application file for complete search history.

(56) References Cited

U.S. PATENT DOCUMENTS

| | | | |
|---|---|---|---|
| 7,628,514 B2* | 12/2009 | Hsu | G02B 5/0236 |
| | | | 362/330 |
| 7,850,319 B2* | 12/2010 | Yoshikawa | G02B 1/11 |
| | | | 359/614 |
| 8,034,434 B2* | 10/2011 | Sakuma | G02B 1/118 |
| | | | 428/172 |
| 2003/0180476 A1 | 9/2003 | Yamashita et al. | |
| 2005/0195503 A1 | 9/2005 | Chen | |
| 2008/0113093 A1 | 5/2008 | Hanney | |
| 2008/0137202 A1* | 6/2008 | Hsu | G02B 5/0215 |
| | | | 359/599 |
| 2010/0165468 A1 | 7/2010 | Yamada et al. | |
| 2014/0168797 A1 | 6/2014 | Shindo et al. | |
| 2015/0103226 A1* | 4/2015 | Takahashi | G02B 1/118 |
| | | | 348/335 |
| 2015/0253532 A1 | 9/2015 | Lin | |

FOREIGN PATENT DOCUMENTS

| | | |
|---|---|---|
| CN | 203881963 U | 10/2014 |
| EP | 1857841 A1 | 11/2007 |
| JP | 49-11904 A | 2/1974 |
| JP | 7-325207 A | 12/1995 |
| JP | 11-64703 A | 3/1999 |
| JP | 2001-517319 A | 10/2001 |
| JP | 2006-293093 A | 10/2006 |
| JP | 2007-322763 A | 12/2007 |
| JP | 2008-509829 A | 4/2008 |
| JP | 2009-169303 A | 7/2009 |
| JP | 2009-198626 A | 9/2009 |
| JP | 2009-198627 A | 9/2009 |
| JP | 5512269 B2 | 6/2014 |
| JP | 2015-18005 A | 1/2015 |
| JP | 2016-18081 A | 2/2016 |

OTHER PUBLICATIONS

Written Opinion of the International Searching Authority, issued in PCT/JP2017/025263, PCT/ISA/237, dated Sep. 19, 2017.

* cited by examiner

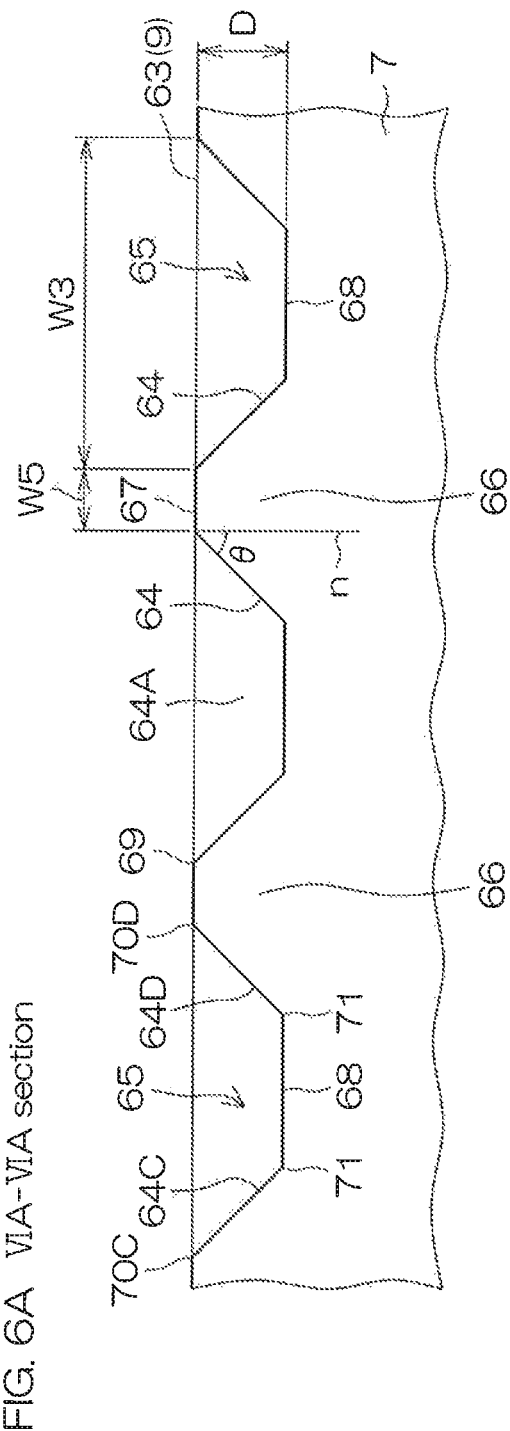
FIG. 6A VIA-VIA section
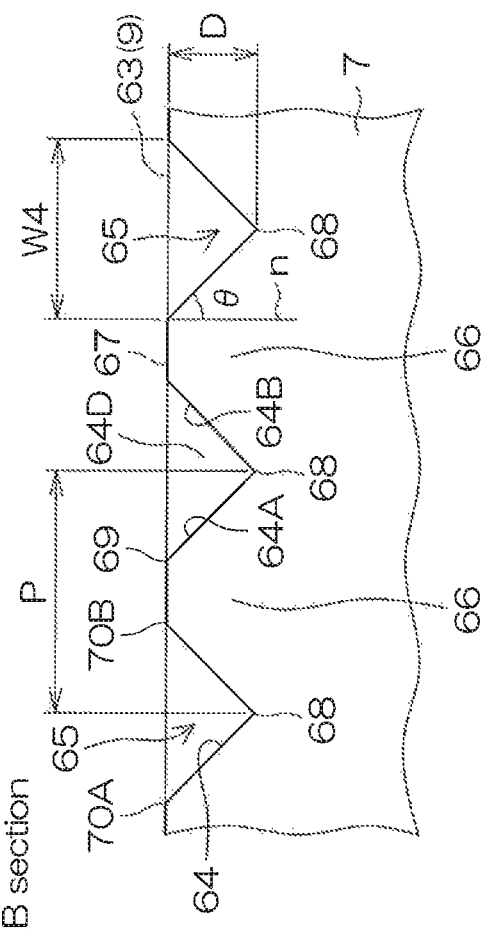
FIG. 6B VIB-VIB section

ANTI-REFLECTIVE BODY, CAMERA UNIT, MOBILE DEVICE, AND METHOD FOR MANUFACTURING ANTI-REFLECTIVE BODY

TECHNICAL FIELD

The present invention relates to an anti-reflective structural body, a camera unit that includes the anti-reflective structural body (lens barrel), a mobile device installed with the camera unit, and a method for manufacturing the anti-reflective structural body.

BACKGROUND ART

As conventional examples of an anti-reflective structural body that suppresses reflection of light, the structural bodies described in Patent Literatures 1 and 2 have been proposed.

Patent Literature 1 discloses an anti-reflective structure portion that includes a base structure portion, arranged by an alignment of a plurality of structural units, each disposed on a reference surface and having a first side surface, with which an angle α formed with the reference surface is a predetermined angle, and a plurality of finely uneven portions, formed on a surface of the basic structure portion and arrayed regularly at a period of not more than a predetermined wavelength.

Patent Literature 2 discloses an anti-reflective film constituted of a substrate layer, constituted, at least at one surface side, of an optically transparent material exhibiting an anti-reflective characteristic in relation to a wavelength of radiation that is incident on the surface.

CITATION LIST

Patent Literature

Patent Literature 1: Japanese Patent No. 5512269
Patent Literature 2: Japanese Translation of International Application (Kohyo) No. 2001-517319

Technical Problem

Designs of industrial products have been diversifying in recent years and an external appearance design can influence sales of a product. Diverse textures are thus required of materials that are visible from the exterior in addition to materials constituting the body of a product.

For example, a lens barrel of a camera unit installed in a mobile device, such as a smartphone, etc., appears as a portion of the external appearance through a transparent cover glass mounted on the device main body and it is therefore necessary that the camera unit is finished to a texture that would not impair the external appearance design. More specifically, unless a treatment that suppresses reflection of light is applied to the lens barrel that is black in color, the structure of the camera unit would be conspicuous when the device main body is viewed from the exterior and it may not be possible to harmonize it with the design of the device main body. It is considered that such a problem would become more significant as the lens barrel is enlarged in diameter in accompaniment with enlargement of lens aperture in recent years. Also, suppression of reflectance of the lens barrel can prevent unwanted reflected light from entering inside the lens and therefore also contributes to improvement of optical characteristics of the camera unit.

In this respect, with the invention described in Patent Literature 1, not a lens barrel, but a lens body of a lens body unit has the base structure portions, constituted of projecting portions, formed on an internal peripheral surface thereof and further has the fine uneven structures formed on a side surface of each base structure portion to suppress the reflection of light in an interior of the lens body.

However, when a projecting shape, such as the base structure portion of Patent Literature 1, is formed as anti-reflective structural body on an outer surface of a product, the projection may become chipped due to some form of contact during handling during manufacture and may form unwanted particles. Especially when the anti-reflective structural body is used in a precision device, a small amount of particles may have a critical influence on the device.

Although on the other hand, it may be considered to form an anti-reflective film by vapor deposition on a surface of a lens barrel, this causes increase of the number of steps in a manufacturing process and also has problems of unevenness of color within the film, attachment of fingerprints, scratch marks, etc.

SUMMARY OF INVENTION

Thus, an object of the present invention is to provide an anti-reflective structural body, capable of expressing an excellent reflection suppression function and capable of suppressing generation of defective goods, a camera unit that includes the anti-reflective structural body, and a mobile device installed with the camera unit.

Also, another object of the present invention is to provide a method for manufacturing an anti-reflective structural body, by which the anti-reflective structural body can be manufactured easily and at low cost.

Solution to Problem

An anti-reflective structural body according to the present invention is constituted of an integrally molded article and includes an anti-reflective structure formed on a base surface that forms an outer surface of the molded article, and the anti-reflective structure includes a plurality of recesses, each being formed such that each recess is recessed from the base surface independently of mutually adjacent recesses and having an inclined surface, which is inclined with respect to the base surface and forms at least one punctiform or linear apex portion at a bottom portion.

According to this arrangement, reflection of light incident on the base surface can be suppressed by the plurality of recesses being arrayed on the outer surface (base surface) of the molded article. Also, the anti-reflective structure is not a projecting structure but is a structure that is recessed with respect to the base surface and therefore even if some form of contact occurs with the outer surface of the molded article, it would not have an influence on the recesses. Forming of unwanted particles can thereby be prevented and shape change of the recesses can also be prevented, thereby enabling maintenance of a reflection suppression function of the anti-reflective structural body.

Also, the anti-reflective structural body is an integrally molded article and can therefore be manufactured easily and at low cost by injection and molding of a raw material in a metal mold as in a manufacturing method according to the present invention. That is, with the method for manufacturing an anti-reflective structural body according to the present invention, the anti-reflective structural body according to the present invention is obtained by injecting and molding a raw material in a metal mold, having a plurality of independent projections arrayed on an inner surface.

With the anti-reflective structural body according to the present invention, the plurality of recesses may include a plurality of conical recesses, with each of which the inclined surface forms a punctiform apex portion.

When the conical recesses include polygonal conical recesses, each having a polygonal opening portion, the anti-reflective structural body according to the present invention may include, on the base surface, ridgeline portions disposed at boundary portions of the polygonal conical recesses that are mutually adjacent.

According to this arrangement, the reflection of light can be suppressed efficiently across the entire base surface because a flat raw material region (region in which the molded article raw material is exposed) is not present on the base surface and the plurality of conical recesses are formed closely adjacently. Also, although if a flat raw material region is provided on the base surface, a difference in reflectance may arise between the raw material region and the conical recesses to form a contrast in color tone on the base surface and impair the external appearance, such a problem can also be solved. Also, attachment of fingerprints to and forming of scratch marks on the base surface can also be prevented.

The "ridgeline portion" as referred to here may be defined, for example, as a rectilinear portion at which a boundary portion of the polygonal conical recesses that are mutually adjacent is formed to a width less than a width necessary to form a thin film, such as an anti-water-repellency film, an anti-reflective film, etc. The width of the ridgeline portion is not restricted in particular and may, for example, be approximately 0.001 mm to 0.1 mm.

When, with the anti-reflective structural body according to the present invention, the conical recesses include quadrilateral conical recesses, each having a quadrilateral opening portion, the quadrilateral conical recesses may be arrayed in a lattice.

According to this arrangement, the quadrilateral conical recesses are arrayed with regularity along a vertical direction (first direction) and a lateral direction (second direction) that are mutually orthogonal and therefore the reflection of light on the base surface can be suppressed uniformly.

With the anti-reflective structural body according to the present invention, a pitch between the conical recesses that are mutually adjacent (mutual distance between apex portions) may be 0.05 mm to 0.4 mm.

With the anti-reflective structural body according to the present invention, each of the recesses may have a quadrilateral opening portion, a first inclined surface and a second inclined surface, respectively extending from a first side and a second side, which, among four sides of the opening portion, face each other, may form a linear apex portion, and a third inclined surface and a fourth inclined surface, respectively extending from a remaining third side and fourth side among the four sides of the opening portion, may form punctiform apex portions with the first inclined surface and the second inclined surface, at respective end portions of the linear apex portion.

With the anti-reflective structural body according to the present invention, the opening portion may be formed to a rectangular shape, with which the first side and the second side are made longer than the third side and the fourth side.

With the anti-reflective structural body according to the present invention, a pitch between the recesses that are mutually adjacent (mutual distance between the linear apex portions) may be 0.05 mm to 0.4 mm.

With the anti-reflective structural body according to the present invention, the inclined surfaces of the recesses may be inclined at an angle of 10° to 45° with respect to a normal to the base surface.

With the anti-reflective structural body according to the present invention, the opening portions of the recesses may have a size of 0.05 mm to 0.4 mm.

If the size of the opening portions of the recesses is within the range mentioned above as in the present arrangement, the precise shape can be formed easily with a molding metal mold, unlike in a case where an anti-reflective structure of a nanometer order is formed by a method, such as nanoimprinting, etc., as is done conventionally.

With the anti-reflective structural body according to the present invention, a depth of the recesses may be 0.05 mm to 2.0 mm.

With the anti-reflective structural body according to the present invention, the base surface and the inclined surfaces of the recesses may be finished to a state where the raw material of the molded article is exposed.

According to this arrangement, there is no need to further form a thin film, such as an anti-reflective film, etc., on the base surface of the molded article and the number of steps in a manufacturing process can thus be reduced. Also, the "state where the raw material of the molded article is exposed" may indicate that the base surface and the inclined surfaces of the recesses are not covered with a thin film, etc., constituted of a raw material differing from the raw material of the molded article.

With the anti-reflective structural body according to the present invention, the raw material of the molded article may contain a color material of black color.

According to this arrangement, a molded article having a high degree of blackness due to suppression of reflectance can be provided. Such a molded article can be used favorably as a lens barrel.

That is, the anti-reflective structural body according to the present invention may include a lens barrel, having a cylindrical portion, defining a hollow internal space for housing a lens, and an annular top portion, formed integral to one end of the cylindrical portion and having an aperture for incidence of light. In this case, the anti-reflective structure may be formed on a surface of the annular top portion at a side opposite the internal space.

A camera unit for mobile device according to the present invention includes the lens barrel according to the present invention, a lens housed in the internal space of the lens barrel, and an imaging element disposed on the lens barrel at a side opposite the annular top portion.

Also, a mobile device according to the present invention is installed with the camera unit according to the present invention.

According to this arrangement, the reflection suppressing lens barrel of black color according to the present invention is included and therefore, for example, when the color of a base member, on which the camera unit is mounted, is black, the black color of the base member and the black color of the lens barrel can be harmonized and a mobile device of excellent external appearance can be provided.

BRIEF DESCRIPTION OF DRAWINGS

FIG. 6A and FIG. 6B are sectional views respectively appearing when the anti-reflective structure is sectioned along line VIA-VIA and line VIB-VIB of FIG. 5.

DESCRIPTION OF EMBODIMENTS

Preferred embodiments of the present invention shall now be described in detail with reference to the attached drawings.

Figure 1:
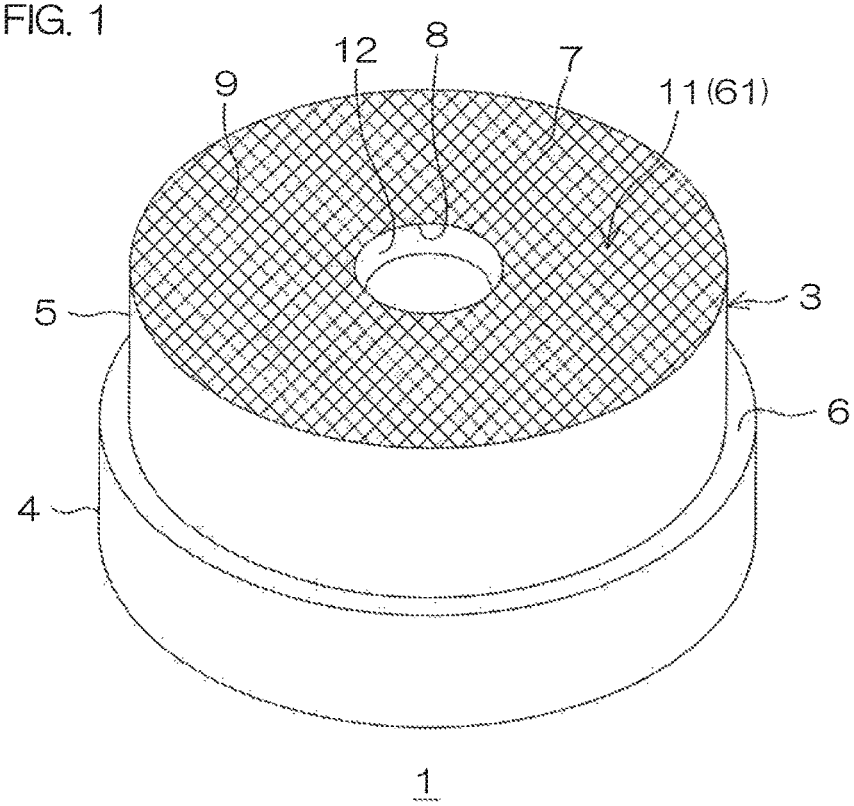
FIG. 1 is a general arrangement diagram of a lens barrel according to a preferred embodiment of the present invention as viewed from above.
Figure 2:
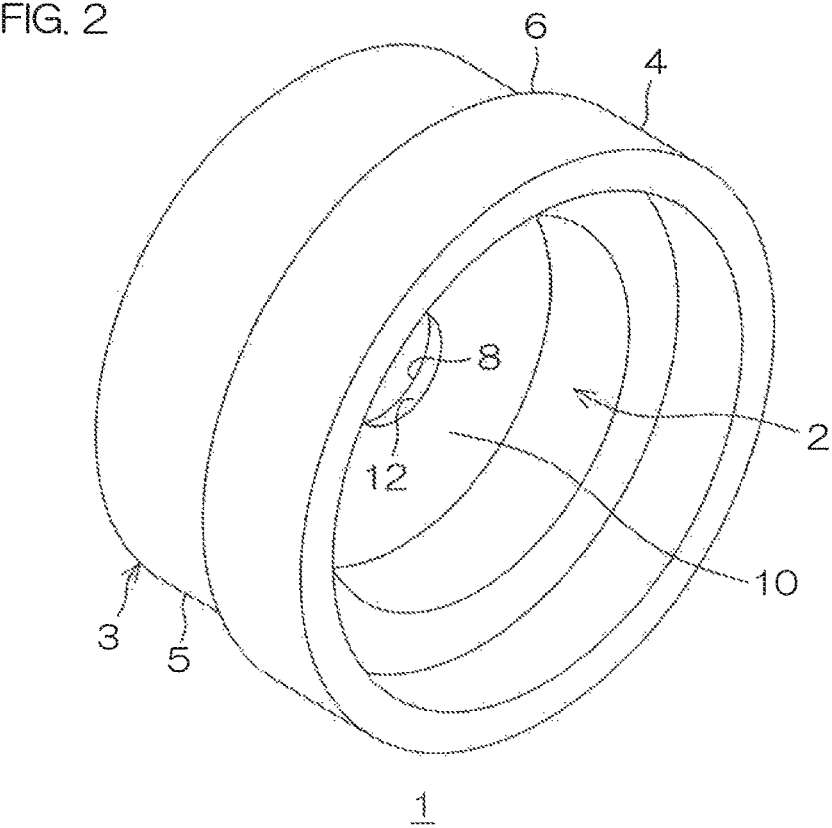
FIG. 2 is a general arrangement diagram of the lens barrel according to the preferred embodiment of the present invention as viewed from below.

FIG. 1 and FIG. 2 are general arrangement diagrams of a lens barrel 1 according to a preferred embodiment of the present invention as viewed from above and below, respectively.

The lens barrel 1 as an example of an anti-reflective structural body according to the present invention includes, as a main body portion, a cylindrical portion 3 defining a lens housing portion 2 as an example of a hollow internal space for housing lenses 34 to be described below.

The cylindrical portion 3 has a two-stage structure, in which a first portion 4 of relatively large diameter and a second portion 5 of smaller diameter than the first portion 4 are coupled and, at a boundary portion of these portions, a step portion 6 is formed over an entire periphery of the cylindrical portion 3. An inner diameter of the first portion 4 may, for example, be 3.0 mm to 5.0 mm, and an inner diameter of the second portion 5 may, for example, be 3.0 mm to 5.0 mm. Also, an axial direction height of the cylindrical portion 3 may, for example, be 0.50 mm to 5.0 mm. Although omitted in FIG. 1 and FIG. 2, a thread portion 38 (see FIG. 9), for screwing onto a housing 33 of a camera unit 27, to be described below, may be formed on an outer peripheral surface of the first portion 4.

An annular top portion 7 is provided at a second portion 5 side end portion (one end portion) of the cylindrical portion 3. The annular top portion 7 is formed to a circular annular plate shape having an aperture 8, for taking light into the lens housing portion 2, at a central portion. A surface (outer surface 9) of the annular top portion 7 at a side opposite the lens housing portion 2 constitutes a circular region surrounding the aperture 8 and an anti-reflective structure 11 is formed over an entirety of the circular region. On the other hand, a surface (inner surface 10) of the annular top portion 7 at the lens housing portion 2 side is a smooth surface on which the anti-reflective structure 11 is not formed.

The aperture 8 of the annular top portion 7 penetrates through the annular top portion 7 in a thickness direction and is formed to a circular shape having a tapered peripheral surface 12, which, in the thickness direction, widens in diameter toward the side opposite the lens housing portion 2. A diameter (maximum diameter) of the aperture 8 of the annular top portion 7 is, for example, 1.0 mm to 3.0 mm with respect to an outer diameter (for example of 4.0 mm to 7.0 mm) of the annular top portion 7.

Also, a first portion 4 side end portion (other end portion) of the cylindrical portion 3 is opened with an inner diameter dimension of the first portion 4.

The lens barrel 1 is formed of a molded article with which the cylindrical portion 3 and the annular top portion 7 are integral.

A base raw material of the molded article is not restricted in particular and a natural rubber, synthetic rubber, (synthetic) resin, etc., can be cited as examples, and preferably a synthetic resin is used. As the synthetic resin, a thermosetting resin, such as a phenol resin, epoxy resin, melamine resin, etc., or a thermoplastic resin, such as a styrene resin, ABS resin, PPS resin, PBT resin, COP resin, COC resin, LCP resin, acrylic resin, polyamide resin, polycarbonate resin, etc., can be cited. More preferably among these, a polycarbonate resin is used. The base raw materials mentioned above may each be used alone or may be used in combination.

The base raw material of the lens barrel 1 contains a color material of black color to impart a black color to the lens barrel 1. The color material of black color is not restricted in particular and carbon black, graphite, titanium black, etc., can be cited as examples. Also, an example of a content ratio of the color material of black color with respect to the base raw material is 0.1 to 15 parts by mass of carbon black with respect to 100 parts by mass of polycarbonate resin. The content ratio of the color material of black color should be changed as appropriate in accordance with intended use of the lens barrel 1.

Also, the base raw material of the lens barrel 1 may contain a filler, such as glass fibers, carbon fibers, microfibers, etc., as necessary.

Figure 3:
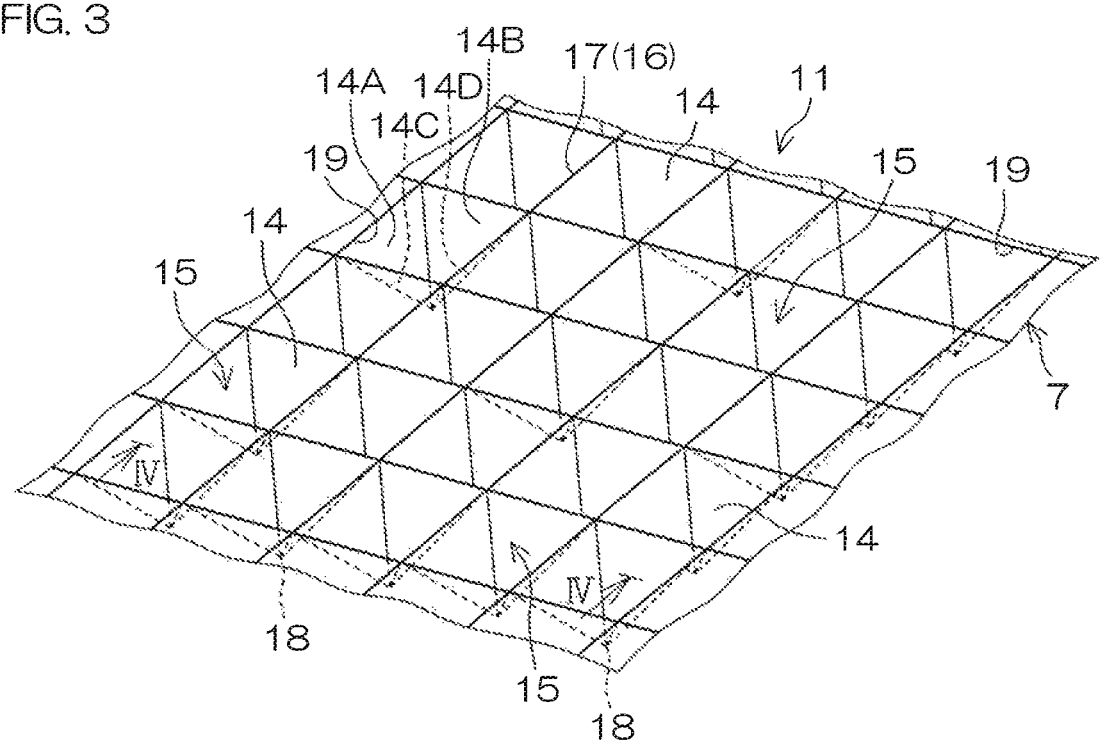
FIG. 3 is an enlarged view of principal portions of an anti-reflective structure (first mode) of FIG. 1.
Figure 4A:
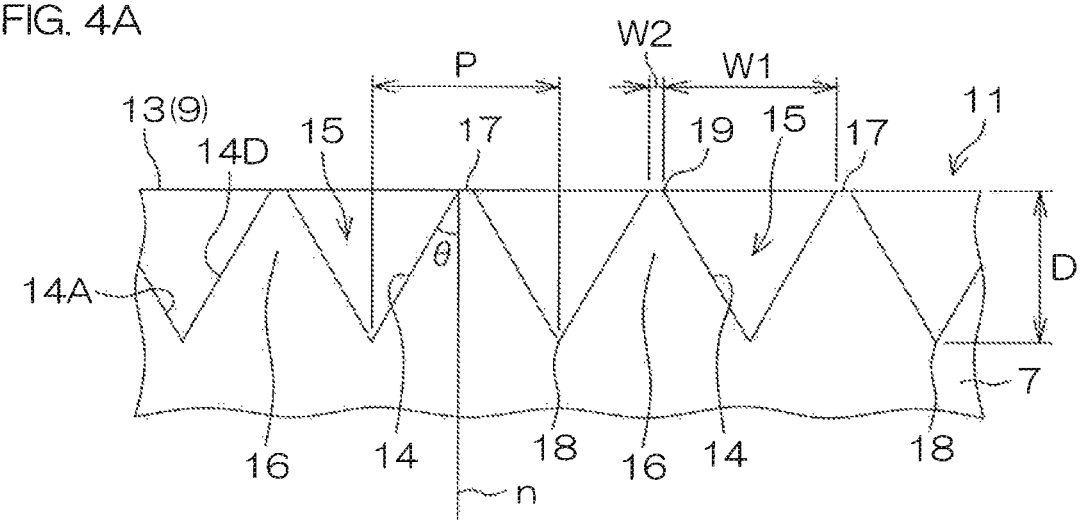
FIG. 4A and FIG. 4B are sectional views appearing when the anti-reflective structure is sectioned along line IV-IV of FIG. 3.
Figure 4B:
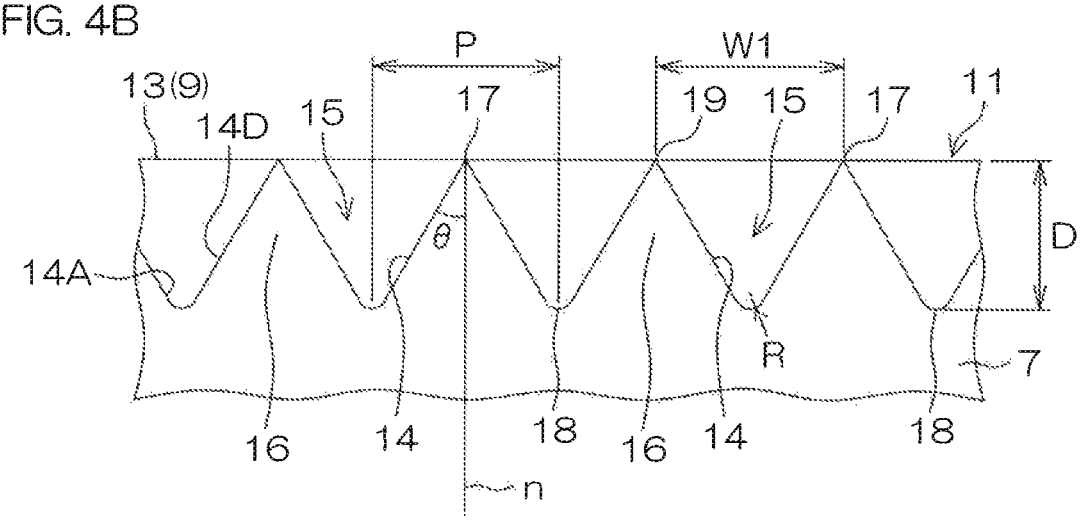

FIG. 3 is an enlarged view of principal portions of the anti-reflective structure 11 (first mode) of FIG. 1. FIG. 4A and FIG. 4B are sectional views appearing when the anti-reflective structure 11 is sectioned along line IV-IV of FIG. 3. In FIG. 3, for the sake of clarity, inclined surfaces 14 and tip apex portions 18 of conical recesses 15 that are visible in transparent view are shown just for a portion of the conical recesses 15.

As shown in FIG. 3 and FIGS. 4A and 4B, the anti-reflective structure 11 includes a plurality of the conical recesses 15 and a frame portion 16, constituted of boundary portions of mutually adjacent conical recesses 15 and surrounding the respective conical recesses 15.

Each conical recess 15 is formed to be recessed toward an inner direction of the annular top portion 7 (lens barrel 1) from a base surface 13 set at a height position of top portions 17 of the frame portion 16. That is, each conical recess 15 is a recess constituted of a conical hollow space having inclined surfaces 14 spreading toward the base surface 13 with a tip apex portion 18, which is a punctiform apex portion disposed in an interior of the annular top portion 7, as a center. Also, each conical recess 15 is disposed to be, by the frame portion 16, independent of the conical recesses 15 that are mutually adjacent.

To describe the shape of the conical recesses 15 specifically, each conical recess 15 of FIG. 3 has an opening portion 19 of quadrilateral shape (square shape). A size (width) $W_1$ of the opening portion 19 may, for example, be 0.05 mm to 0.4 mm. If the size of the opening portion 19 of the conical recess 15 is thus within the range mentioned above, the precise shape can be formed easily with a molding metal mold (for example, a female mold 20 and a male mold 21 to be described below) unlike in a case where an anti-reflective structure of a nanometer order is formed by a method, such as nanoimprinting, etc., as is done conventionally.

The conical recess 15 constitutes a quadrilateral conical recess having a first inclined surface 14A, a second inclined surface 14B, a third inclined surface 14C, and a fourth inclined surface 14D that are inclined toward the tip apex portion 18 from respective sides of the opening portion 19 and join into one at the tip apex portion 18. In FIG. 3 and FIGS. 4A and 4B, the first to fourth inclined surfaces 14A, 14B, 14C, and 14D are shown in just one conical recess 15 for the sake of clarity.

Also, the inclined surfaces 14 of each conical recess 15 may be inclined at an angle θ of 10° to 45° with respect to a normal n to the base surface 13 as shown in FIGS. 4A and 4B. Also, a depth D (distance from the base surface 13 to the tip apex portion 18) of each conical recess 15 may, for example, be 0.05 mm to 2.0 mm. Also, a pitch P between the conical recesses 15 that are mutually adjacent (mutual distance between tip apex portions 18) may be 0.05 mm to 0.4 mm.

Also, the tip apex portion 18 of each conical recess 15 may be pointed sharply as shown in FIG. 4A or may be rounded and formed to an arcuate shape as shown in FIG. 4B. In the case of FIG. 4B, a radius of curvature R of the tip apex portion 18 may, for example, be approximately 0.01 mm to 0.1 mm.

Also, in FIG. 3, the frame portion 16 is formed to a lattice and one each of the conical recesses 15 is formed in each lattice window portion. The plurality of conical recesses 15 are thereby arrayed in a lattice pattern. The top portions 17 (boundary portions of the conical recesses 15 that are mutually adjacent) of the frame portion 16 are formed as ridgeline portions of less than a predetermined width. For example, as shown in FIG. 4A, the top portions 17 of the frame portion 16 are formed as rectilinear portions, each formed to a width $W_2$ that is less than a width necessary to form a thin film, such as an anti-water-repellency film, an anti-reflective film, etc., and intersecting each other orthogonally. The width $W_2$ of the top portions 17 as the ridgeline portions is not restricted in particular and may, for example, be 0.001 mm to 0.1 mm. Also, the top portions 17 of the frame portion 16 may be formed to be pointed sharply in sectional view (that is, such that the width $W_2$=0 μm) and be straight lines as shown in FIG. 4B. When, as shown in FIG. 4B, the top portions 17 of the frame portion 16 are formed as ridgeline portions of width $W_2$=0 μm, the pitch P and the size (width) $W_1$ of the opening 19 may be matched.

Also, in the anti-reflective structure 11, the base surface 13 (top portions 17) and the inclined surfaces 14 of the conical recesses 15 are finished to a state where the raw material of the lens barrel 1 is exposed. That is, the base surface 13 and the inclined surfaces 14 of the conical recesses 15 are not covered with a thin film, etc., that is constituted of a raw material differing from the raw material of the lens barrel 1 and also, the conical recesses 15 are not necessarily refilled with another resin material, etc., but are maintained in a hollow state.

A second mode of the anti-reflective structure 11 shall now be described by way of an anti-reflective structure 61. That is, the anti-reflective structure of the lens barrel 1 may be of the first mode (FIG. 3, FIG. 4A, and FIG. 4B), described above as the anti-reflective structure 11, or may be of the second mode, disclosed as the anti-reflective structure 61 in FIG. 5, FIG. 6A, and FIG. 6B.

Figure 5:
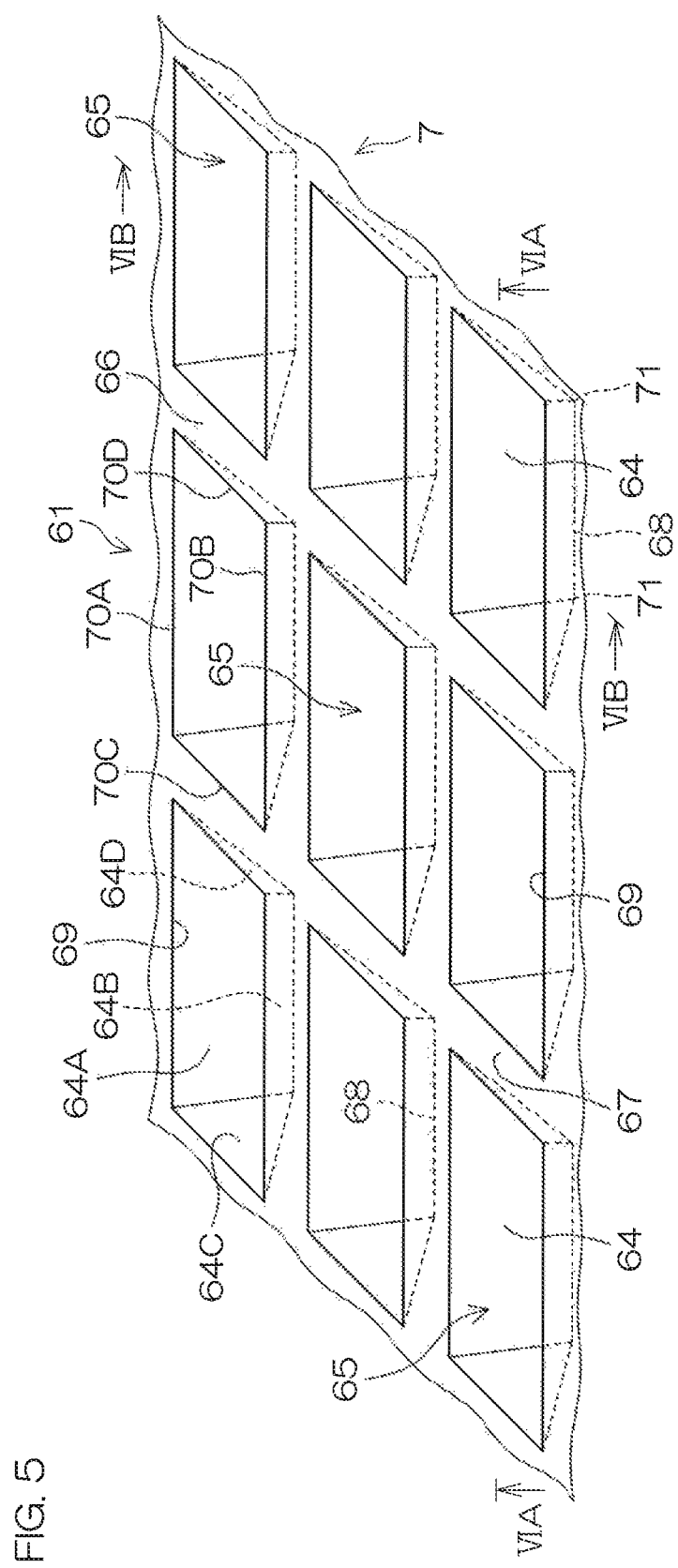
FIG. 5 is an enlarged view of principal portions of an anti-reflective structure (second mode) of FIG. 1.

FIG. 5 is an enlarged view of principal portions of the anti-reflective structure 61 (second mode) of FIG. 1. FIG. 6A and FIG. 6B are sectional views respectively appearing when the anti-reflective structure 61 is sectioned along line VIA-VIA and line VIB-VIB of FIG. 5.

As shown in FIG. 5 and FIGS. 6A and 6B, the anti-reflective structure 61 includes a plurality of recesses 65 and a frame portion 66, constituted of boundary portions of mutually adjacent recesses 65 and surrounding the respective recesses 65.

Each recess 65 is formed to be recessed toward the inner direction of the annular top portion 7 (lens barrel 1) from a base surface 63 set at a height position of top portions 17 of the frame portion 66. That is, each recess 65 is a recess constituted of a hollow space having inclined surfaces 64 spreading toward the base surface 63 from a tip apex portion 68 disposed in the interior of the annular top portion 7. Also, each recess 65 is disposed to be, by the frame portion 66, independent of the recesses 65 that are mutually adjacent.

To describe the shape of the recesses 65 specifically, each recess 65 of FIG. 5 has an opening portion of quadrilateral shape (rectangular shape). A size (length) $W_3$ of the opening portion 69 in a length direction may, for example, be 0.05 mm to 0.4 mm. A size (width) $W_4$ of the opening portion 69 in a width direction may, for example, be 0.05 mm to 0.4 mm. If the sizes of the opening portion 69 of the recess 65 are thus within the ranges mentioned above, the precise shape can be formed easily with a molding metal mold (for example, the female mold 20 and the male mold 21 to be described below) unlike in a case where an anti-reflective structure of the nanometer order is formed by a method, such as nanoimprinting, etc., as is done conventionally.

The opening 69 of the recess 65 has a first side 70A and a second side 70B that face each other and a third side 70C and a fourth side 70D that face each other. With the recess 65, a first inclined surface 64A and a second inclined surface 64B, respectively extending from the first side 70A and the second side 70B, form the tip apex portion 68 as a linear apex portion. On the other hand, a third inclined surface 64C and a fourth inclined surface 64D, respectively extending from the third side 70C and the fourth side 70D, form punctiform apex portions with the first inclined surface 64A and the second inclined surface 64B at respective end portions 71, 71 of the linear tip apex portion 68. In FIG. 5 and FIGS. 6A and 6B, the first to fourth inclined surfaces 64A, 64B, 64C, and 64D are shown in just one recess 65 for the sake of clarity.

Also, the inclined surfaces 64 of each recess 65 may be inclined at an angle θ of 10° to 45° with respect to a normal n to the base surface 63 as shown in FIGS. 6A and 6B. Also, a depth D (distance from the base surface 63 to the tip apex portion 68) of each recess 65 may, for example, be 0.05 mm to 2.0 mm. Also, a pitch P between the recesses 65 that are mutually adjacent (mutual distance between tip apex portions 68) may be 0.05 mm to 0.4 mm.

Also, the tip apex portion 68 of each recess 65 may be pointed sharply as shown in FIG. 6B or may be rounded and formed to an arcuate shape as the tip apex portion 18 shown in FIG. 4B described above.

Also, in FIG. 5, the frame portion 66 is formed to a lattice and one each of the recesses 65 is formed in each lattice window portion. The plurality of recesses 65 are thereby arrayed in a lattice pattern. Top portions 67 (boundary portions of the recesses 65 that are mutually adjacent) of the frame portion 66 are formed as ridgeline portions of less than a predetermined width. For example, as shown in FIG. 6A, the top portions 67 of the frame portion 66 are formed as rectilinear portions, each formed to a width $W_5$ that is less than a width necessary to form a thin film, such as an anti-water-repellency film, an anti-reflective film, etc., and intersecting each other orthogonally. The width $W_5$ of the top portions 67 as the ridgeline portions is not restricted in particular and may, for example, be 0.001 mm to 0.1 mm. Also, the top portions 67 of the frame portion 66 may be formed to be pointed sharply in sectional view (that is, such that the width $W_5=0$ μm) and be straight lines as the top portions 17 shown in FIG. 4B described above.

Also, in the anti-reflective structure 61, the base surface 63 (top portions 67) and the inclined surfaces 64 of the recesses 65 are finished to a state where the raw material of the lens barrel 1 is exposed. That is, the base surface 63 and the inclined surfaces 64 of the recesses 65 are not covered with a thin film, etc., that is constituted of a raw material differing from the raw material of the lens barrel 1 and also, the recesses 65 are not necessarily refilled with another resin material, etc., but are maintained in a hollow state.

A method for manufacturing the lens barrel 1 shall now be described with reference to FIG. 7A and FIG. 7B.

Figure 7A:
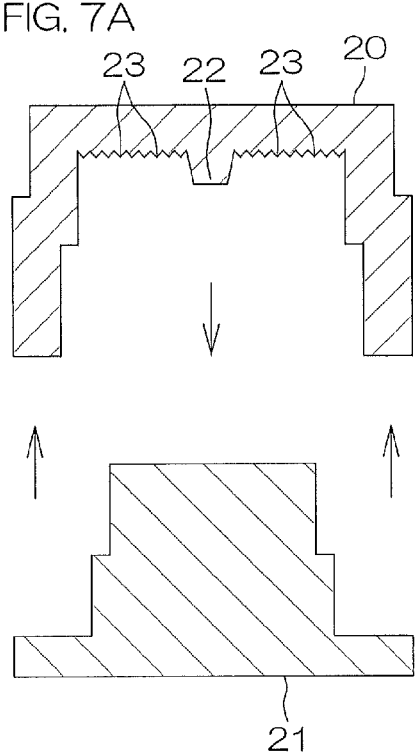
FIG. 7A and FIG. 7B are diagrams showing, in the order of process, a method for manufacturing the lens barrel shown in FIG. 1 to FIGS. 4A and 4B.
Figure 7B:
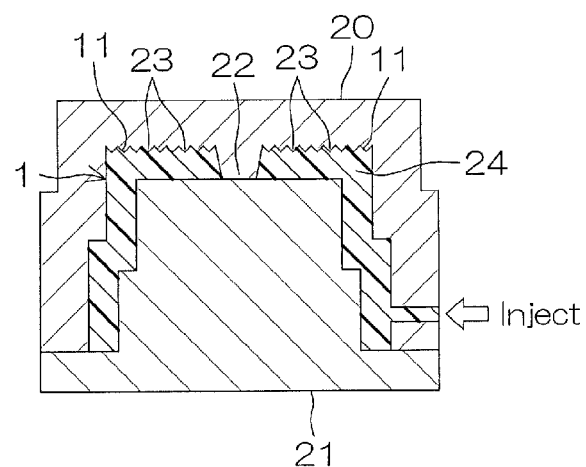

FIG. 7A and FIG. 7B are diagrams showing, in the order of process, a method for manufacturing the lens barrel 1 shown in FIG. 1 to FIGS. 4A and 4B. In FIG. 7A and FIG. 7B, just arrangements, which, among the arrangements of the lens barrel 1 shown in FIG. 1 to FIGS. 4A and 4B, are necessary for description are illustrated and the rest are omitted.

To manufacture the lens barrel 1, first, molding metal molds (for example, the female mold 20 and the male mold 21) are prepared as shown in FIG. 7A. A projection 22, corresponding to the aperture 8 of the annular top portion 7, and a plurality of conical projections 23, arrayed in plurality such as to surround the projection 22, are formed on an inner surface (internal bottom surface) of the female mold 20. The conical projections 23 are formed in an opposite pattern with respect to the conical recesses 15 of the lens barrel 1. A mold clamping step is then performed by mating the female mold 20 and the male mold 21.

Next, as shown in FIG. 7B, a base raw material 24 is injected in a molten state between the female mold 20 and the male mold 21 that are in the mold-clamped state. As the base raw material 24, the base raw material described above is used. Also, if the base raw material 24 contains a filler or an additive, the filler is mixed with the base raw material prior to injection into the metal molds. A resin temperature in this process may, for example, be 280° C. to 350° C., a filling pressure may, for example, be 50 MPa to 230 MPa, and an injection speed may, for example, be 50 mm/s to 220 mm/s.

Next, the injected base raw material 24 is subject to dwelling and cooling. A dwell pressure in this process may, for example, be 50 MPa to 140 MPa. Also, an injection time that is a sum of a filling time and a dwelling time may, for example, be 1 second to 10 seconds. After cooling, mold opening is performed and the lens barrel 1 having the anti-reflective structure 11 described above is obtained.

If the lens barrel 1 has the anti-reflective structure 61 shown in FIG. 5, FIG. 6A, and FIG. 6B, the shape of the conical recesses 23 should be changed in accordance with the shape of the recesses 65 of the anti-reflective structure 61.

As described above, with the lens barrel 1 of the present preferred embodiment, reflection of light incident on the base surface 13 can be suppressed by the plurality of conical recesses 15 (recesses 65) being arrayed on the outer surface 9 (base surface 13) of the annular top portion 7. Also, the anti-reflective structure 11 (anti-reflective structure 61) is not a projecting structure but is a structure that is recessed with respect to the base surface 13 and therefore even if some form of contact occurs with the outer surface 9 of the annular top portion 7, it would not have an influence on the conical recesses 15 (recesses 65). Forming of unwanted particles can thereby be prevented and shape change of the conical recesses 15 (recesses 65) can also be prevented, thereby enabling maintenance of a reflection suppression function of the lens barrel 1.

Further, the reflection of light can be suppressed efficiently across the entire base surface 13 because the top portions 17 of the frame portion 16 (top portions 67 of the frame portion 66) of the lens barrel 1 are formed as ridgeline portions and the plurality of conical recesses 15 (recesses 65) are formed closely adjacently. Also, although if the top portions 17 of the frame portion 16 (top portions 67 of the frame portion 66) are formed as comparatively wide flat regions, a difference in reflectance may arise between the flat regions and the conical recesses 15 (recesses 65) to form a contrast in color tone on the base surface 13 and impair the external appearance, such a problem can also be solved. Also, attachment of fingerprints to and forming of scratch marks on the base surface 13 can also be prevented because the top portions 17 (top portions 67) have a lattice line shape.

Further, with the present preferred embodiment, the quadrilateral conical recesses 15 (recesses 65) in the anti-reflective structure 11 (anti-reflective structure 61) are arrayed with regularity along a vertical direction and a lateral direction that are mutually orthogonal and therefore the reflection of light on the base surface 13 can be suppressed uniformly.

Also, the lens barrel 1 is an integrally molded article of resin, etc., and can therefore be manufactured easily and at low cost by injection and molding of the raw material 24 in a metal mold (the female mold 20 and the male mold 21) (FIG. 7B) as in the manufacturing method shown in FIG. 7A and FIG. 7B. Moreover, as shown in FIG. 7B, the lens barrel 1 is obtained upon completion of the molding step and there is no need to further form a thin film, such as an anti-reflective film, etc., on the lens barrel 1 thereafter. The number of steps of the manufacturing process can thus be reduced.

An example of a mode of use of the lens barrel 1 shall now be described with reference to FIG. 8A, FIG. 8B, and FIG. 9.

Figure 8B:
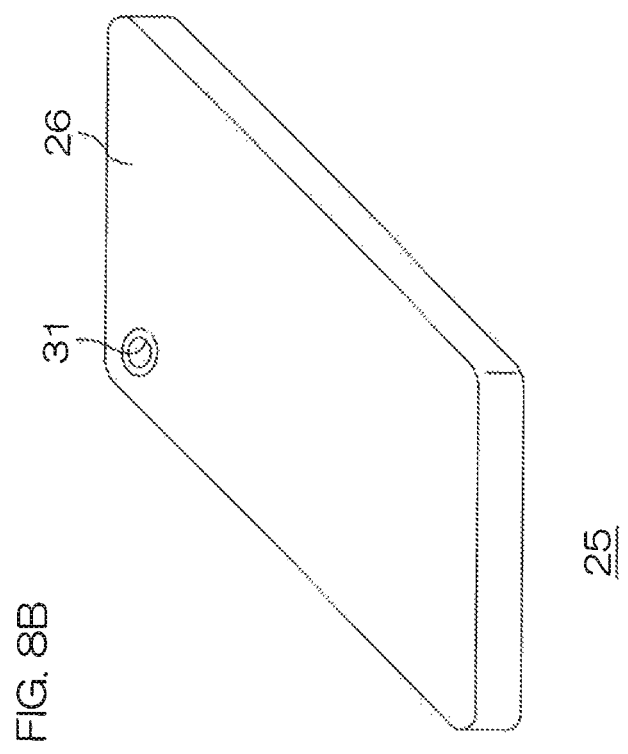
FIG. 8A and FIG. 8B are general arrangement diagrams of a smartphone according to a preferred embodiment of the present invention, with FIG. 8A showing a front surface side of the smartphone and FIG. 8B showing a back surface side of the smartphone.
Figure 8A:
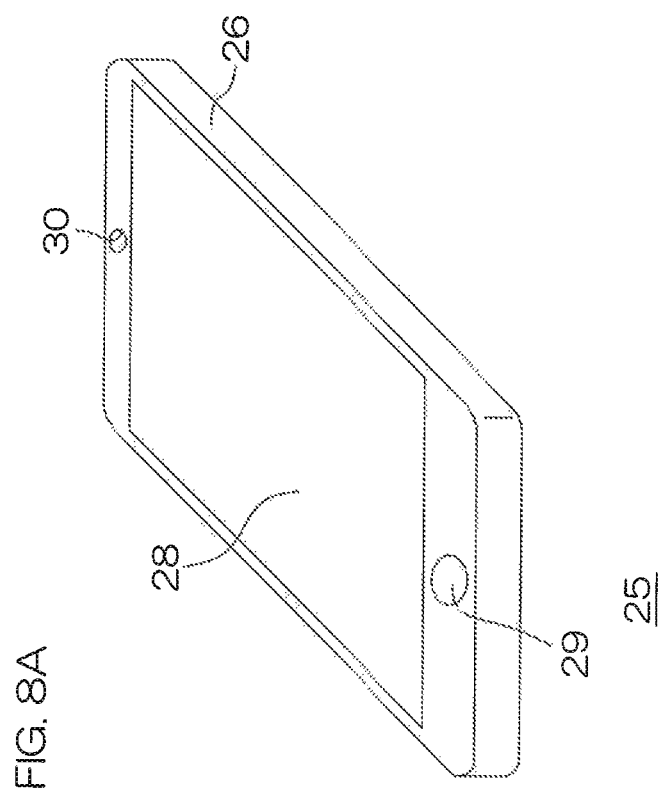

FIG. 8A and FIG. 8B are general arrangement diagrams of a smartphone 25 according to a preferred embodiment of the present invention, with FIG. 8A showing a front surface side of the smartphone 25 and FIG. 8B showing a back surface side of the smartphone 25. FIG. 9 is a sectional view showing the general arrangement of a camera unit 27 installed in the smartphone 25 of FIG. 8A and FIG. 8B.

The smartphone 25 has a housing 26 of flat rectangular parallelepiped shape. In addition to various electronic components, the camera unit 27 according to the preferred embodiment of the present invention is housed in an interior of the housing 26.

As shown in FIG. 8A, a display surface 28 of a display panel, made of a liquid crystal panel, etc., is exposed at a front surface of the housing 26. One button 29 is provided at a portion along one short side of the housing 26. A user can perform various operations of the smartphone by operating the button 29. Also, a camera lens window 30 is formed at a portion along the other short side of the housing 26.

On the other hand, at a rear surface of the housing 26, a camera lens window 31 is formed at one corner portion of the housing 26.

Figure 9:
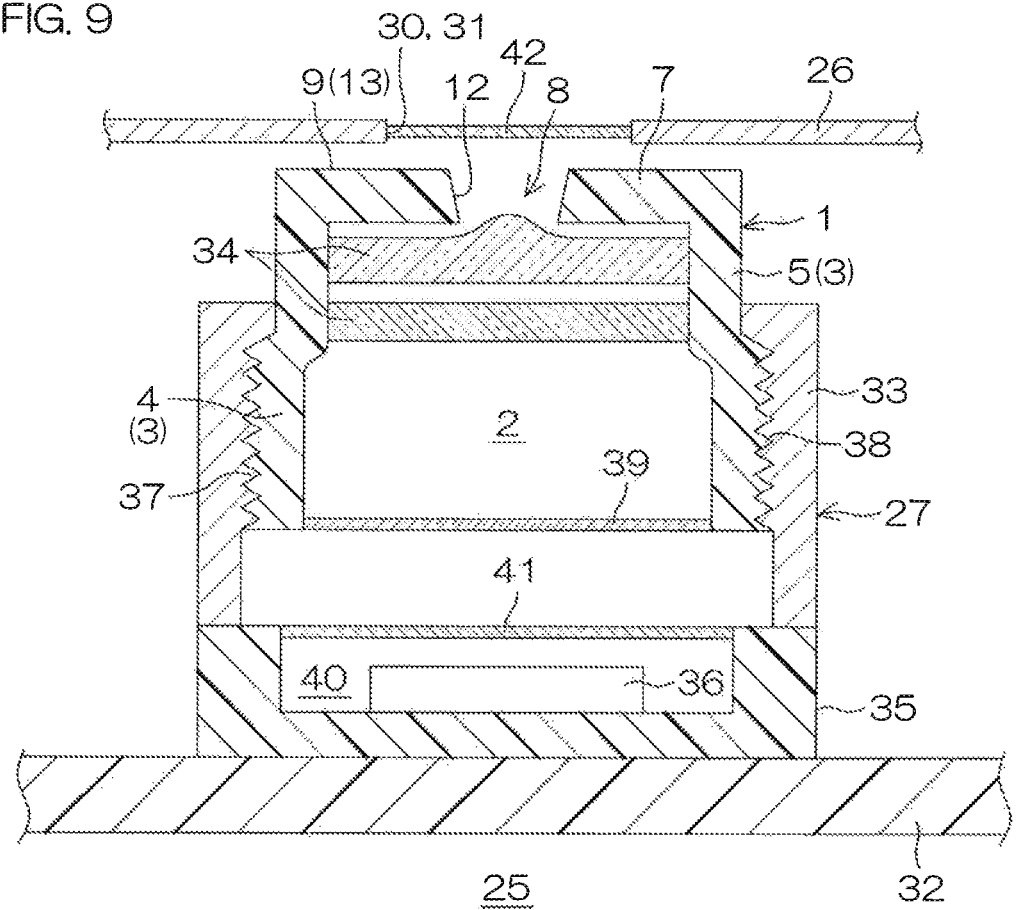
FIG. 9 is a sectional view showing the general arrangement of a camera unit installed in the smartphone of FIG. 8A and FIG. 8B.

In the interior of the housing 26, a camera unit 27 is disposed across the camera lens window 30 or 31 as shown in FIG. 9.

As show in FIG. 9, the camera unit 27 is disposed on a substrate 32 in the interior of the housing 26. The substrate 32 includes, for example, a known printed circuit board (PCB). An IC chip (not shown), arranged to control the camera unit 27, etc., may be installed on the substrate 32 in addition to the camera unit 27. The camera unit 27 may also be connected to a known flexible substrate (FPC).

The camera unit 27 includes the housing 33, the lens barrel 1, the lenses 34, a sensor cover 35, and an imaging sensor 36.

The housing 33 is formed, for example, to a cylindrical shape with both end portion open. A thread portion 37 is formed on an inner peripheral surface of the housing 33. The lens barrel 1 is fixed to the housing 33 by the thread portion 38, formed on the outer peripheral surface of the first portion 4 of the lens barrel 1, being screwed onto the thread portion 37.

The lens barrel 1 is provided such that the second portion 5 projects (is exposed) from one end portion in an axial direction of the housing 33. The lenses 34 are provided in the lens housing portion 2 of the lens barrel 1. Although in FIG. 9, just two lenses 34 are shown, two or more lenses may be disposed.

An optical filter 39 is provided at a first portion 4 side end portion (other end portion) of the lens barrel 1. An infrared cut filter (film), etc., can be cited as an example of the optical filter 39.

The sensor cover 35 is mounted to the other end portion in the axial direction (side opposite the lens barrel 1) of the housing 33. The sensor cover 35 is formed to a bowl shape defining a sensor housing portion 40 in an interior and the imaging sensor 36 is disposed in the sensor housing portion 40. The sensor housing portion 40 is closed by a cover member (for example, a cover glass) 41.

Also, with the camera unit 27, the aperture 8 of the lens barrel 1 is disposed to face the lens window 30 or 31. The diameter of the aperture 8 of the lens barrel 1 is smaller than a diameter of the lens window 30 or 31 and a portion of the annular top portion 7 of the lens barrel 1 is thereby put in a state of being visible, through the lens window 30 or 31, as a portion of the external appearance of the smartphone 25.

When a photograph is taken by operating the smartphone 25, light reflected from a subject passes through a cover member 42 of the lens window 30 or 31 and the aperture 8 of the lens barrel 1 and is focused by the lenses 34 and detected by the imaging sensor 36. A detected signal is then processed and an image is displayed on the display surface 28 of the smartphone 25.

As described above, with the smartphone 25, the lens barrel 1 described above is installed as the lens barrel of the camera unit 27. Reflectance of light that is made incident through the lens window 30 or 31 and reflected by the annular top portion 7 of the lens barrel 1 can thus be suppressed. Consequently, even if an interior of the smartphone 25 is viewed through the lens window 30 or 31, the lens barrel 1 is high in degree of blackness and inconspicuous and impairment of the external appearance of the smartphone 25 can thus be prevented. Further, if the housing 26 of the smartphone 25 is black, the color of the housing 26 and the color of the lens barrel 1 would be harmonized, which is excellent in terms of design as well.

Although a preferred embodiment of the present invention has been described above, the present invention may be implemented in other modes.

Figure 10:
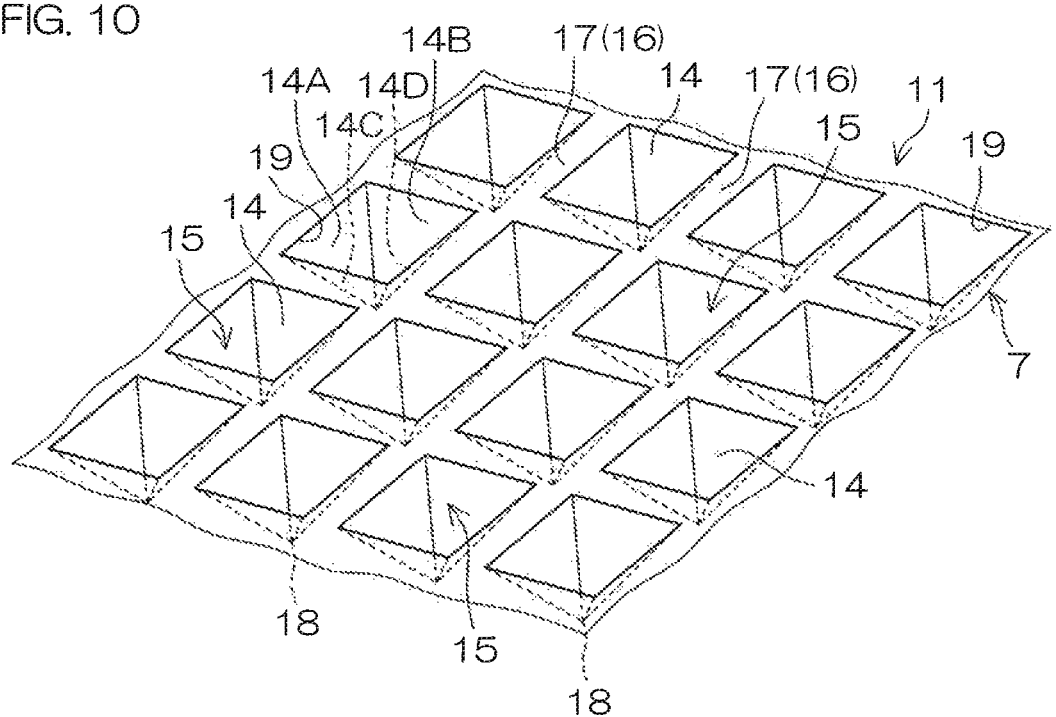
FIG. 10 is a diagram showing a variation of an array pattern of a plurality of conical recesses of the lens barrel.

For example, although with the preferred embodiment described above, the top portions 17 of the frame portion 16 of the lens barrel 1 are formed as ridgeline portions, the top portions 17 may instead be formed as comparatively wide flat regions as shown in FIG. 10.

Figure 11:
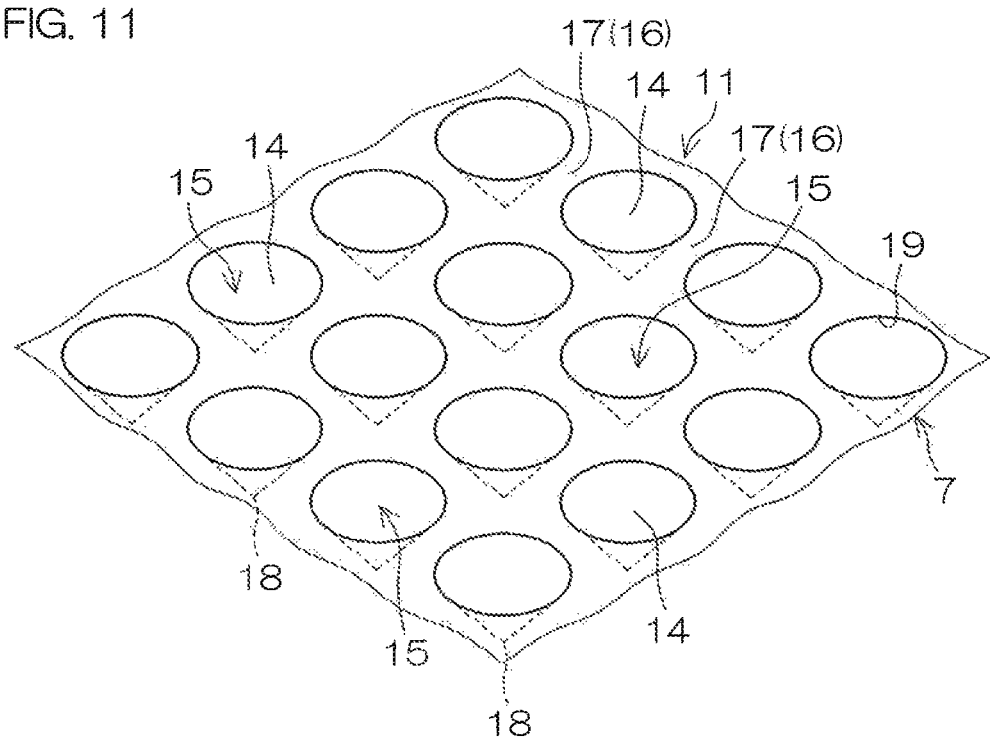
FIG. 11 is a diagram showing a variation of an array pattern of a plurality of conical recesses of the lens barrel.
Figure 12:
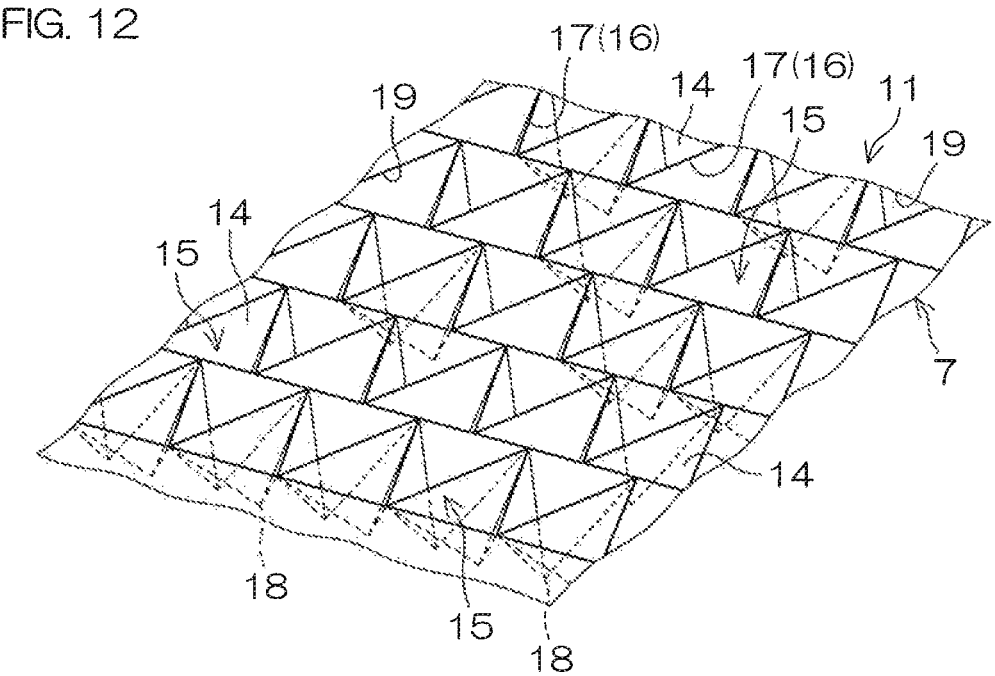
FIG. 12 is a diagram showing a variation of an array pattern of a plurality of conical recesses of the lens barrel.

Also, although with the preferred embodiment described above, the conical recesses 15 are formed as quadrilateral conical recesses 15, the recesses may, for example, be circular conical recesses 15 as shown in FIG. 11 or may be triangular conical recesses 15 as shown in FIG. 12. In the case of the triangular conical recesses 15, the top portions 17 can be formed as ridgeline portions by arraying the plurality of triangular conical recesses 15 in a truss.

Also, although with the preferred embodiment described above, the opening portion 69 of each recess 65 is formed to a rectangular shape with the first side 70A and the second side 70B being made longer than the third side 70C and the fourth side 70D, it may be instead be formed to a square shape with the lengths of the first side 70A to the fourth side 70D all being made the same.

Figure 13:
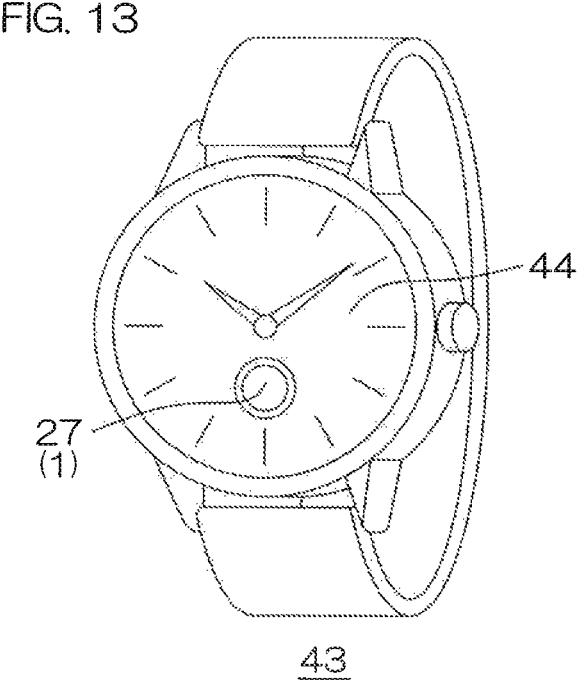
FIG. 13 is a general arrangement diagram of a wristwatch according to another preferred embodiment of the present invention.
Figure 14:
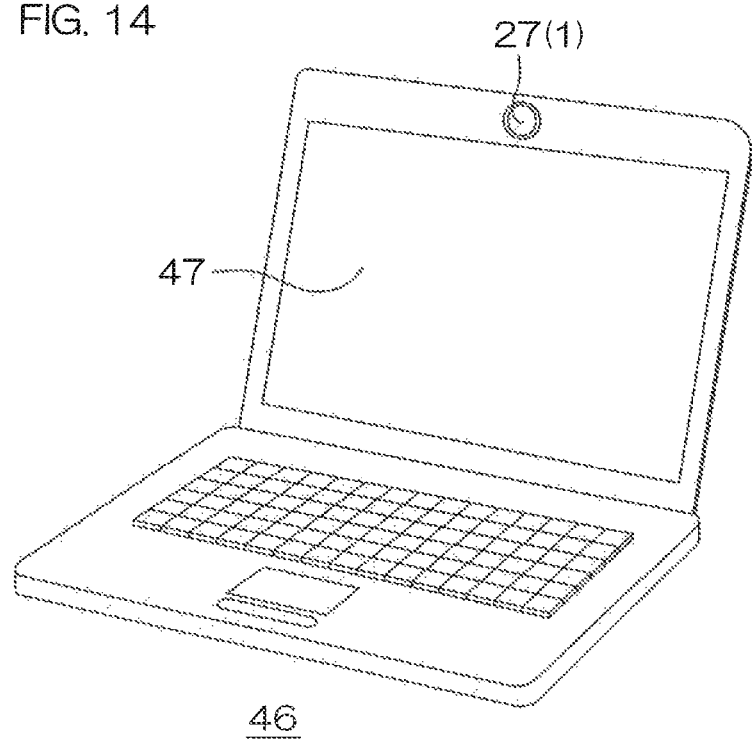
FIG. 14 is a general arrangement diagram of a notebook computer according to another preferred embodiment of the present invention.

Also, although with the preferred embodiment described above, the smartphone 25 was indicated as an example of a mode of use of the lens barrel 1, as shown in FIG. 13, the lens barrel 1 may be used in a camera unit 27 housed at a rear side of a dial face 44 of a wristwatch 43 or may be used in a camera unit 27 housed at an upper side of a display surface 47 of a laptop computer 46. Besides the above, use in a camera unit installed in any of various portable equipment, such as a portable game machine, a portable audio player, etc., is also possible.

Also, although with the preferred embodiment described above, just the lens barrel 1 was taken up as an example of the anti-reflective structural body that includes the anti-reflective structure according to the present invention, the anti-reflective structure according to the present invention may be used favorably not just in an optical component, such as a lens barrel, etc., but also in a design component, such as in an automotive interior material, etc.

Besides the above, various design changes may be applied within the scope of the matters described in the claims.

The present application corresponds to Japanese Patent Application No. 2016-226195 filed in the Japan Patent Office on Nov. 21, 2016 and the entire disclosure of this application is incorporated herein by reference.

EXAMPLES

Although the present invention shall now be described by way of examples and comparative examples, the present invention is not restricted by the examples described below.

(1) Manufacture of Lens Barrel

Example 1

Using pellets of a carbon-black-blended polycarbonate resin (Calibre 301-22, manufactured by Sumika Polycarbonate Limited), a lens barrel was injection-molded in accordance with the process of FIG. 7A and FIG. 7B. The lens barrel 1 having the anti-reflective structure 11, constituted of the plurality of quadrilateral conical recesses 15, on the annular top portion 7 was thereby obtained.

The molding conditions were set, for example, as follows: resin temperature=approximately 320° C., injection pressure (filling pressure=approximately 210 MPa, dwell pressure=approximately 110 MPa), injection speed=approximately 200 mm/s, injection time (filling time+dwelling time)=approximately 1.6 seconds.

Also, in regard to the quadrilateral conical recesses 15 of the lens barrel 1 that was obtained: pitch P=0.1 mm, depth D=0.08 mm, and inclined surface 14 angle θ=30°.

Example 2

Besides forming the recesses 65 shown in FIG. 5, FIG. 6A, and FIG. 6B in place of the quadrilateral conical recesses 15, a lens barrel was obtained by the same process as that of Example 1. In regard to the recesses 65 of the lens barrel 1 that was obtained: pitch P=0.1 mm, depth D=0.1 mm, and inclined surface 64 angle θ=30°.

Comparative Example 1

Besides making the outer surface 9 of the annular top portion 7 a smooth surface and not forming the quadrilateral conical recesses 15 on the outer surface 9, a lens barrel was obtained by the same process as that of Example 1. The surfaces of the molds were roughened by a blast treatment to apply surface texturing to the outer surface 9 of the annular top portion 7 of the lens barrel obtained.

Comparative Example 2

Besides not applying the surface texturing, a lens barrel was obtained by the same process as that of Comparative Example 1. That is, with the lens barrel of Comparative Example 2, the outer surface 9 of the annular top portion 7 was formed as a smooth surface.

(2) Reflectance Measurements

Figure 15:
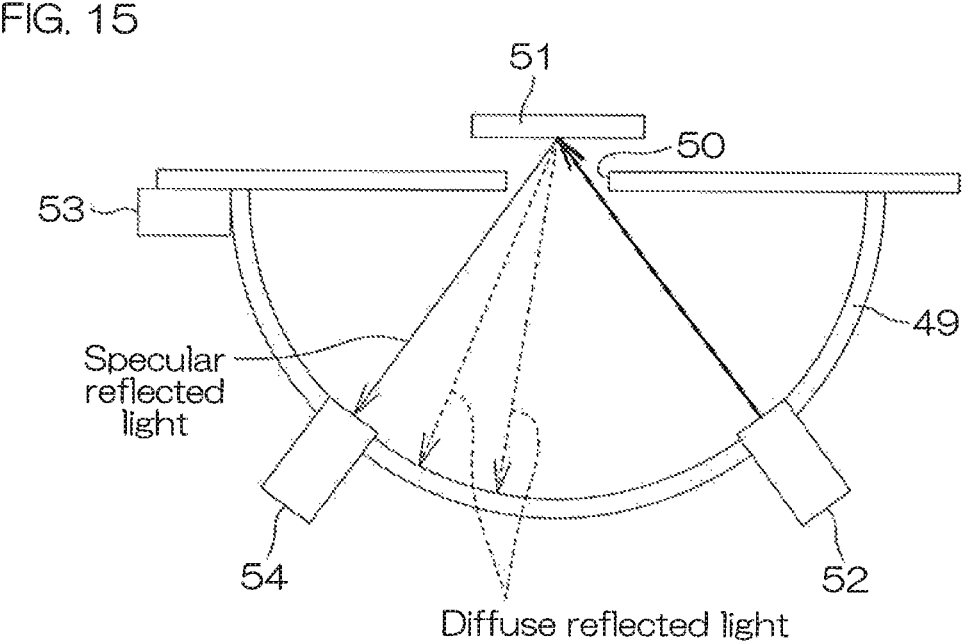
FIG. 15 is a general arrangement diagram of a device used to measure reflectances of examples and comparative examples.
Figure 16:
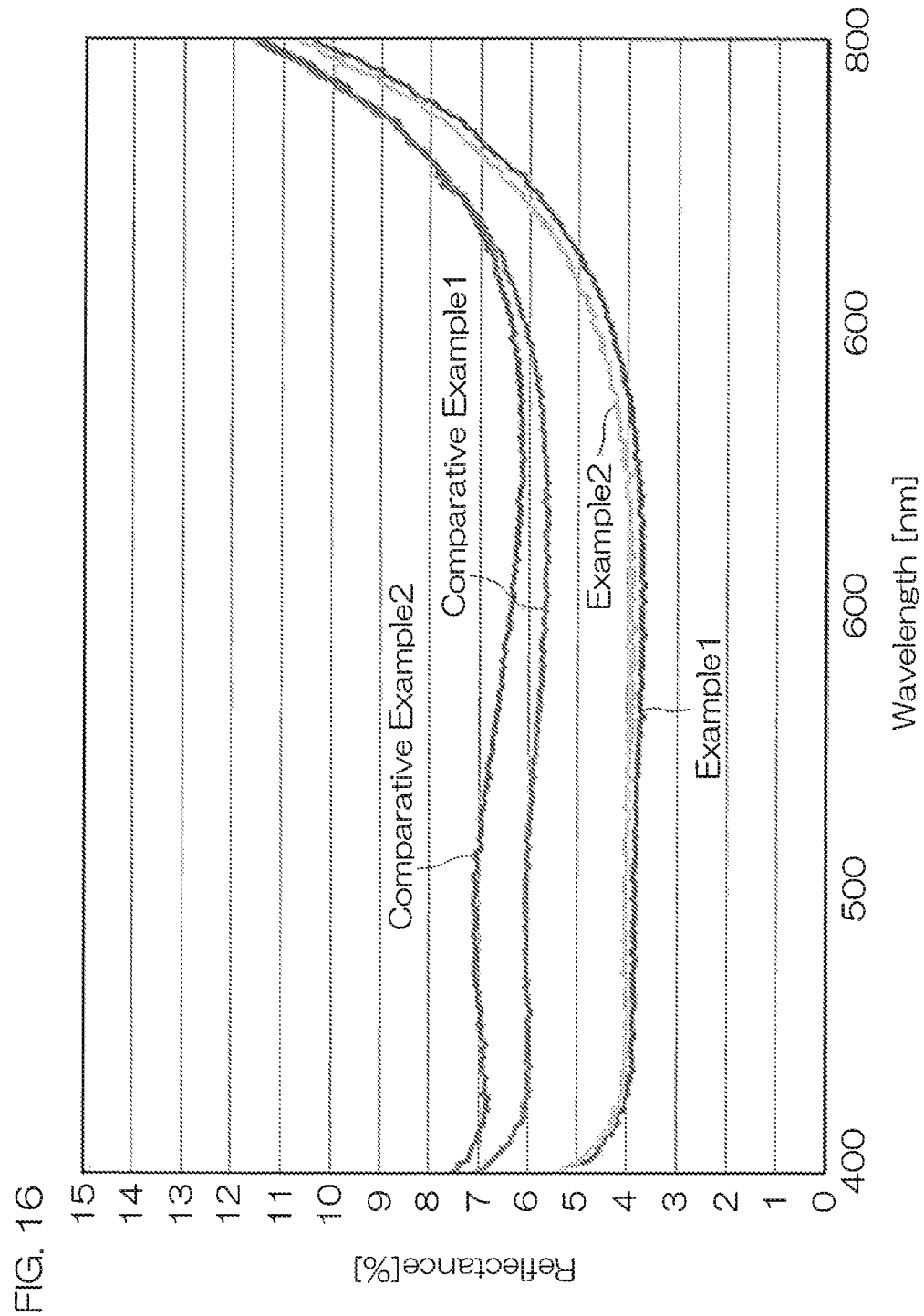
FIG. 16 is a diagram showing reflectance measurement results of the examples and comparative examples.

Reflectance measurements were made using a measurement device 48 shown in FIG. 15. Specifically, each of samples 51, obtained from each of Example 1, Example 2, Comparative Example 1, and Comparative Example 2, was disposed at a measurement position (slit portion 50) on an integrating hemisphere 49 and was made to reflect light irradiated from a light source 52. The reflected light was scattered by the surrounding integrating hemisphere 49 and by detecting averaged light by a detector 53, total reflectance (specular reflectance+diffuse reflectance) was determined (measurement wavelength: range 380 nm to 800 nm). The diffuse reflectance was measured in a state where a lid 54 at a symmetrical position with respect to the light source 52 was removed to eliminate specular reflected light. The results are shown in FIG. 16. Also, values of relative reflectance with the reflectance of aluminum mirror surface (reference) being set to 100% are shown in FIG. 16.

(3) Evaluation

From FIG. 16, it could be confirmed that the lens barrels of Example 1 and Example 2, which have the anti-reflective structures according to the present invention, are capable of realizing lower reflectance in comparison to the lens barrels of Comparative Examples 1 and 2. For example, the reflectance values at wavelengths of 435 nm, 460 nm, 546 nm, and 700 nm are as shown in Table 1 below.

[Table 1]

TABLE 1

|  | 435 nm | 460 nm | 546 nm | 700 nm |
| --- | --- | --- | --- | --- |
| Example 1 | 3.9 | 3.8 | 3.8 | 4.4 |
| Example 2 | 4.1 | 4.0 | 4.0 | 4.7 |
| Comparative Example 1 | 6.0 | 6.0 | 5.9 | 6.1 |
| Comparative Example 2 | 6.9 | 7.0 | 6.8 | 6.4 |

REFERENCE SIGNS LIST

1: lens barrel
2: lens housing portion
3: cylindrical portion
7: annular top portion
8: aperture
9: outer surface (of annular top portion)
11: anti-reflective structure
13: base surface
14: inclined surface
14A: first inclined surface
14B: second inclined surface
14C: third inclined surface
14D: fourth inclined surface
15: conical recess
16: frame portion
17: top portion (of frame portion)
18: tip apex portion
19: opening portion
20: female mold
21: male mold
23: conical projection
24: base raw material
25: smartphone
27: camera unit
34: lens
36: imaging sensor
43: wristwatch
46: notebook computer
61: anti-reflective structure
63: base surface
64: inclined surface
64A: first inclined surface
64B: second inclined surface 64C: third inclined surface
64D: fourth inclined surface
65: recess
66: frame portion
67: top portion (of frame portion)
68: tip apex portion
69: opening portion
70: side
70A: first side
70B: second side
70C: third side
70D: fourth side
71: end portion (of tip apex portion)

The invention claimed is:

1. An anti-reflective structural body constituted of an integrally injection-molded article containing a color material of black color comprising:
   an anti-reflective structure, formed on a base surface that forms an outer surface of the injection-molded article,
   wherein the anti-reflective structure includes a plurality of conical recesses, each being formed such that each conical recess is recessed toward an inner direction of the anti-reflective structural body and projects from the base surface independently of mutually adjacent conical recesses and each conical recess has an inclined surface that is inclined with respect to the base surface and forms a punctiform apex portion at a bottom portion of the conical recess,
   wherein the conical recesses include polygonal conical recesses, each having a polygonal opening portion,
   the anti-reflective structural body comprises ridgeline portions disposed on the base surface at boundary portions of the polygonal conical recesses that are mutually adjacent,
   wherein a pitch between the apex portions of the conical recesses that are mutually adjacent is 0.05 mm to 0.4 mm,
   wherein each polygonal opening portion has a size of 0.05 mm to 0.4 mm,
   wherein each conical recess has a depth of 0.05 mm to 2.0 mm,
   wherein the injection-molded article material is exposed on the base surface and the inclined surfaces of the conical recesses,
   wherein the inclined surface of each conical recess is inclined at an angle of 10° to 45° with respect to a normal to the base surface.

2. The anti-reflective structural body according to claim 1, wherein the conical recesses include quadrilateral conical recesses, each having a quadrilateral opening portion, and the quadrilateral conical recesses are arrayed in a lattice.

3. The anti-reflective structural body according to claim 2, wherein the anti-reflective structural body is operatively connected to a mobile device with a transparent cover glass.

4. The anti-reflective structural body according to claim 1, wherein the anti-reflective structural body comprises: a lens barrel having a cylindrical portion that defines a hollow internal space for housing a lens, and an annular top portion that is formed integral to one end of the cylindrical portion and that has an aperture for incidence of light; and
   wherein the anti-reflective structure is formed on a surface of the annular top portion at a side opposite the internal space.

5. A camera unit for mobile device comprising:
   the lens barrel according to claim 4;
   a lens housed in the internal space of the lens barrel; and
   an imaging element disposed on a side of the lens barrel which is opposite to the annular top portion.

6. A mobile device installed with the camera unit according to claim 5.

7. The anti-reflective structural body according to claim 4, wherein the anti-reflective structural body is operatively connected to a mobile device with a transparent cover glass.

8. A method for manufacturing the anti-reflective structural body according to claim 1 by injecting and molding a raw material in a metal mold, having a plurality of independent projections arrayed on an inner surface.

9. The anti-reflective structural body according to claim 1, wherein the anti-reflective structural body is operatively connected to a mobile device with a transparent cover glass.

10. An anti-reflective structural body constituted of an integrally injection-molded article containing a color material of black color comprising:
    an anti-reflective structure, formed on a base surface that forms an outer surface of the injection-molded article,
    wherein the anti-reflective structure includes a plurality of recesses, each being formed such that each recess is recessed toward an inner direction of the anti-reflective structural body and projects from the base surface independently of mutually adjacent recesses and each recess has four inclined surfaces that are inclined with respect to the base surface and form a linear apex portion at a bottom portion,
    wherein each of the recesses has
    a quadrilateral opening portion,
    a first inclined surface and a second inclined surface, respectively extending from a first side and a second side, which, among four sides of the opening portion, face each other, and form the linear apex portion, and
    a third inclined surface and a fourth inclined surface, respectively extending from a remaining third side and fourth side among the four sides of the opening portion, and forming punctiform apex portions with the first inclined surface and the second inclined surface, at respective end portions of the linear apex portion, and
    wherein a pitch between the linear apex portions of the recesses that are mutually adjacent is 0.05 mm to 0.4 mm,
    wherein each quadrilateral opening portion has a size of 0.05 mm to 0.4 mm,
    wherein each recess has a depth of 0.05 mm to 2.0 mm,
    wherein the injection-molded article material is exposed on the base surface and the inclined surfaces of the recesses,
    wherein the inclined surface of each recess is inclined at an angle of 10° to 45° with respect to a normal to the base surface.

11. The anti-reflective structural body according to claim 10, wherein the opening portion is formed to be a rectangular shape, wherein the first side and the second side are made longer than the third side and the fourth side.

12. The anti-reflective structural body according to claim 11, wherein the anti-reflective structural body is operatively connected to a mobile device with a transparent cover glass.

13. The anti-reflective structural body according to claim 10, wherein the anti-reflective structural body is operatively connected to a mobile device with a transparent cover glass.

* * * * *